Patented May 19, 1936

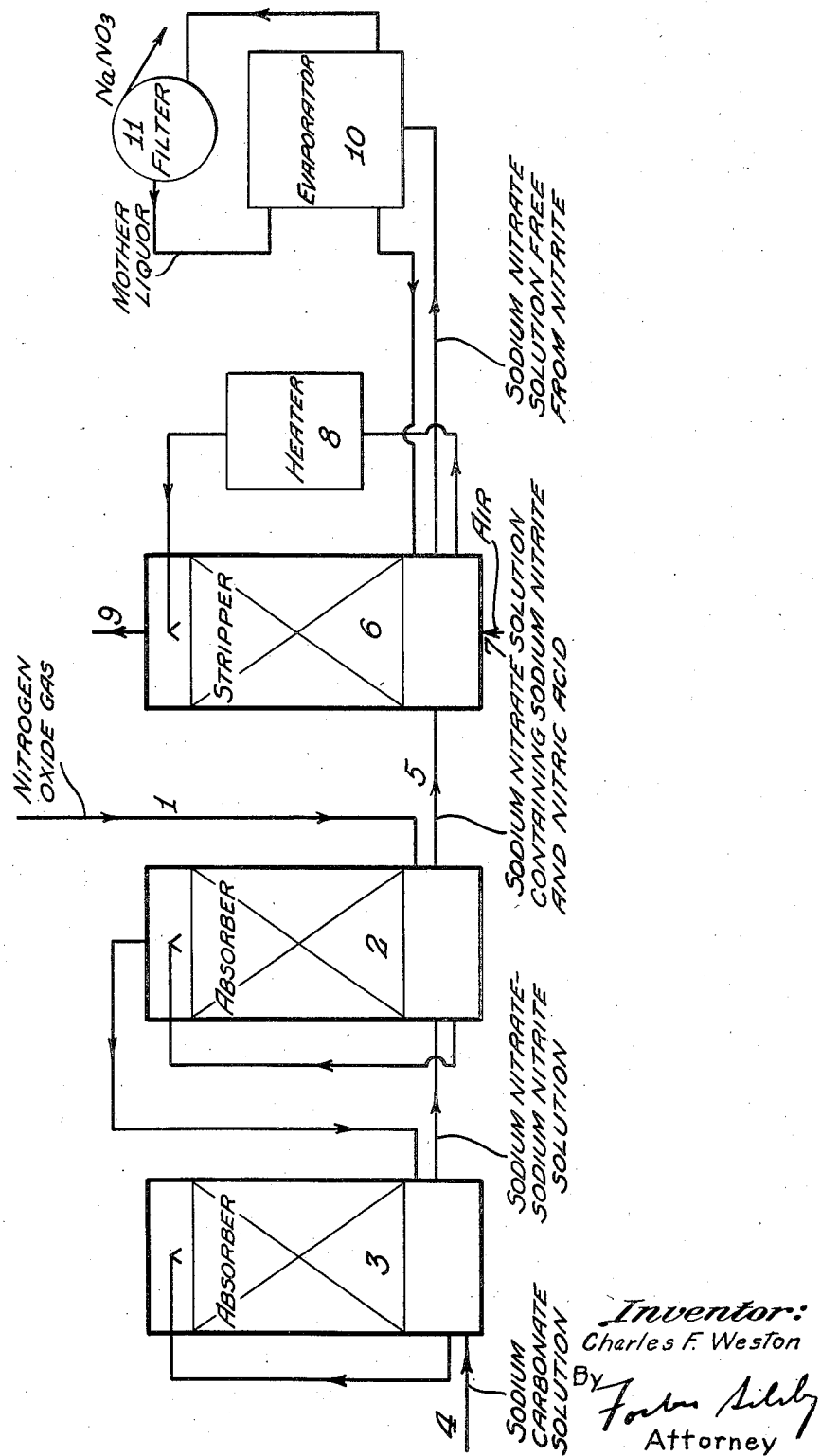

2,041,504

UNITED STATES PATENT OFFICE 2,041,504

PROCESS FOR THE PRODUCTION OF NITRATES

Charles F. Weston, Prince George County, Va., assignor to Atmospheric Nitrogen Corporation, New York, N. Y., a corporation of New York Application October 6, 1931, Serial No. 567,304

5 Claims. (Cl. 23—102)

This invention relates to a process for the production of a nitrate substantially free from nitrite. More particularly, this invention relates to an improvement in the process of producing nitrates by the reaction of nitrogen oxides with a base and water whereby a solid nitrate substantially free from nitrite may be recovered from the resulting nitrate solution which is contaminated with nitrite.

Numerous processes have heretofore been proposed for the production of nitrates by reacting nitrogen oxides with a base and water. For example, it has been proposed to absorb the nitrogen oxides obtained in admixture with other gases by the oxidation of ammonia with air by passing the gases in contact with a solution of a base such as sodium hydroxide or sodium carbonate. As a result of the reaction of the nitrogen oxides with the base and the water, a liquor principally containing sodium nitrate but also containing sodium nitrite is obtained. Solid sodium nitrate may be crystallized from such a liquor by concentrating it. The nitrate thus obtained, however, is contaminated with nitrite, which impurity renders the nitrate objectionable for certain purposes. The primary object of this invention is to provide a process for the recovery of a solid nitrate substantially free from nitrite from a solution of a nitrate containing nitrite.

In treating a solution of nitrate contaminated with nitrite in accordance with this invention, the solution is aerated at an elevated temperature (i. e. at a temperature substantially above ordinary atmospheric temperatures) and in the presence of free nitric acid to reduce the nitrite content of the solution and solid nitrate may then be crystallized from the thus treated liquor. In its preferred embodiment, this invention comprises aerating a nitrate solution containing nitrite by repeatedly passing the solution at an elevated temperature and in the presence of free nitric acid in counter-current flow with a gas such as air which is chemically inert towards the sodium nitrate in the solution until the nitrite content has been sufficiently reduced. This solution is then evaporated and solid nitrate crystallized therefrom while maintaining the nitrite content of the solution at not more than about 2.5 grams of nitrite per liter. The solid nitrate thus obtained will contain, for example, not more than about 0.025% nitrite and is suitable for many purposes for which a nitrate containing a relatively higher proportion of nitrite is objectionable.

In order to facilitate an understanding of the present invention, reference should be had to the following detailed discussion taken in connection with the accompanying drawing, the single figure of which represents diagrammatically an apparatus suitable for carrying out a process for the preparation of sodium nitrate in accordance with the present invention.

In the following description, the invention will be particularly described in connection with the recovery of sodium nitrate from a liquor obtained by the absorption of nitrogen oxides, particularly nitrogen tetroxide, in a solution of a sodium base such as sodium hydroxide or sodium carbonate, but it is to be understood that the invention is not limited to the production of this particular salt or to the specific methods of operation illustrated in the drawing and disclosed hereinafter since these methods are illustrative of the invention.

With reference to the drawing, in absorbing nitrogen oxides in a solution of, for example, sodium carbonate, the nitrogen oxide gases from a pipe 1 may be passed through a series of absorption towers 2 and 3 in intimate contact with a solution of sodium carbonate which is introduced into the last tower 3 of the series with respect to the flow of the gases from a pipe 4 and is passed through the series of towers in reverse order to that in which the gases pass therethrough. A sodium nitrate solution containing sodium nitrite is drawn off from the first tower of the series, tower 2, through a pipe 5. In operating in accordance with this invention, the liquor is treated in towers 2 and 3 with the nitrogen oxide gas until the solution as it leaves tower 2 contains free nitric acid in amount sufficient to completely react with the nitrite in this solution, for example, about 12 to 20 grams of free nitric acid per liter. The acidic solution from tower 2 is introduced into a packed tower 6 through which it is circulated in countercurrent flow and in repeated intimate contacts with a stream of air or other gas chemically inert with respect to the sodium nitrate in the solution from a pipe 7. During this aeration treatment of the liquor, it is maintained at an elevated temperature, preferably at not below about 70° C., either by being passed through a heater 8 in the course of being circulated through the tower or by heating the acidified liquor to the desired temperature prior to introduction into the tower. The air or inert gas may, if desired, likewise be heated. As a result of this treatment with air or inert gas, herein referred to as "aeration", sodium nitrite contained in the liquor is decomposed and forms sodium nitrate with the evolution of nitrogen oxide gases which are carried out of the tower through a pipe 9 by the gas passed through the tower. The described process for producing sodium nitrate, therefore, comprises two treatments of solutions; in the first of which nitrogen oxides are absorbed from a gas containing the same to form the acid solution of nitrate containing nitrite, and in the second of which air or inert gas free from nitrogen oxides is utilized in removing the nitrite from the acidic solution. This aeration treatment in the tower 6 is preferably continued until the nitrite content of the liquor has been reduced below about 0.4 grams per liter and the thus treated liquor may then be concentrated in an evaporator 10 and sodium nitrate crystallized therefrom and recovered in a filter 11 to obtain a product substantially free from nitrite.

It is preferred to operate the process described above in a continuous manner in which a body of nitrate liquor is maintained in circulation at the desired temperature through the aeration tower 6. Nitrate liquor containing nitric acid from the nitrogen oxides absorption towers 2 and 3 is continuously introduced into this circulated body of liquor. The nitrite content of the circulated liquor is preferably maintained at not more than about 0.4 grams per liter by regulating the rate of flow of nitrite containing liquor to the tower and the conditions of the aeration treatment comprising the temperature at which the liquor is treated and the rate of flow of the gas passed through the liquor. If the nitrite content of the liquor tends to increase, this may be corrected either by decreasing the rate with which nitrite containing liquor is supplied to the aeration tower or by increasing the rate of flow of the inert gas through the tower, or by raising the temperature of treatment of the liquor. A change of any one or more of these conditions of treatment of the liquor may be employed to maintain the desired low content of nitrite in the aerated liquor. A portion of the liquor is continuously withdrawn from the aeration treatment and introduced into a body of liquor undergoing concentration in evaporator 10 to crystallize sodium nitrate from the liquor. The crystallized nitrate is separated from mother liquor from filter 11.

During the concentration in evaporator 10 of the liquor from tower 6, the nitrite content of the liquor will increase and is preferably maintained at not more than 2.5 grams per liter in the solution from which the solid sodium nitrate crystallizes by returning a part of the liquor from evaporator 10 to the body of liquor in tower 6 which is subjected to the aeration treatment in this tower. By returning liquor from the evaporator to tower 6, it is possible in a continuously operating process, to obtain a crystallized solid sodium nitrate product containing not more than about 0.025% nitrite.

It is apparent that numerous changes and modifications may be made in the above process without departing from the scope of the invention as defined in the appended claims. The process is suitable for the treatment of solutions of nitrates other than sodium nitrate as, for example, solutions of potassium nitrate or calcium nitrate.

I claim:

1. The process for the recovery of sodium nitrate substantially free from nitrite from a liquor containing the nitrate together with nitrite which comprises repeatedly circulating said liquor at a temperature of not below about 70° C. and in the presence of free nitric acid in intimate contact and in counter-current flow with a current of air substantially free from nitrogen oxides until the nitrite content has been reduced to below about 0.4 grams per liter, withdrawing thus treated liquor, concentrating the withdrawn liquor to crystallize solid sodium nitrate, and returning a portion of the liquor undergoing concentration to the aforesaid treatment with air and replacing the returned liquor with treated liquor in amount to maintain a nitrite content of the concentrated liquor of not more than about 2.5 grams per liter.

2. The process of recovering solid sodium nitrate from a solution of the same containing nitrite which comprises introducing said solution into a body of sodium nitrate liquor containing not more than about 0.4 grams nitrite per liter, repeatedly circulating said liquor at a temperature of about 70° C. and in the presence of free nitric acid in intimate contact and in counter-current flow with a current of air substantially free from nitrogen oxides to decompose nitrite in the liquor and to maintain its nitrite content at not more than about 0.4 grams per liter, withdrawing thus treated liquor from the circulating body of the same, introducing the withdrawn liquor into a body of sodium nitrate liquor undergoing concentration to crystallize solid sodium nitrate therefrom, and returning concentrated liquor from said body of sodium nitrate liquor to the aforesaid body of circulating liquor in amount to maintain a nitrite content of the concentrated liquor from which solid sodium nitrate is crystallized of not more than about 2.5 grams per liter.

3. In a process for the production of a nitrate wherein a gas containing nitrogen oxides diluted with other gases such as is obtained by the oxidation of ammonia with air is passed in contact with a base and water to produce a solution of a nitrate containing a small proportion of a nitrite that improvement which comprises continuing the treatment of the base and water with the nitrogen oxides until the resulting solution contains free nitric acid in amount sufficient to render the solution acidic and to completely react with the small proportion of nitrite contained in the solution and then passing a current of air substantially free from nitrogen oxides in contact with said solution at a temperature of about 70° C. or higher until the solution has been substantially freed of its nitrite content.

4. In a process for the production of a nitrate wherein a gas containing nitrogen oxides diluted with other gases such as is obtained by the oxidation of ammonia with air is passed in contact with a base and water to produce a solution of a nitrate containing a small proportion of a nitrite, that improvement which comprises continuing the treatment of the base and water with the nitrogen oxides until the resulting solution contains free nitric acid in amount sufficient to render the solution acidic and to completely react with the small proportion of nitrite contained in the solution, passing said acidic solution at an elevated temperature in intimate contact with a current of gas substantially free from nitrogen oxides and chemically inert towards sodium nitrate until the nitrite content has been reduced to below about 0.4 grams per liter, concentrating the withdrawn liquor to crystallize solid nitrate, and separating the solid nitrate from the liquor while it contains not more than about 2.5 grams per liter of nitrite.

5. In a process for the production of a nitrate wherein a gas containing nitrogen oxides diluted with other gases such as is obtained by the oxidation of ammonia with air is passed in contact with a base and water to produce a solution of a nitrate containing a small proportion of a nitrite that improvement which comprises continuing the treatment of the base and water with the nitrogen oxides until the resulting solution contains free nitric acid in amount sufficient to render the solution acidic and to completely react with the small proportion of nitrite contained in the solution and then passing a current of air substantially free from nitrogen oxides in contact with said solution at an elevated temperature until the solution has been substantially freed of its nitrite content.

CHARLES F. WESTON.